Figure 1:
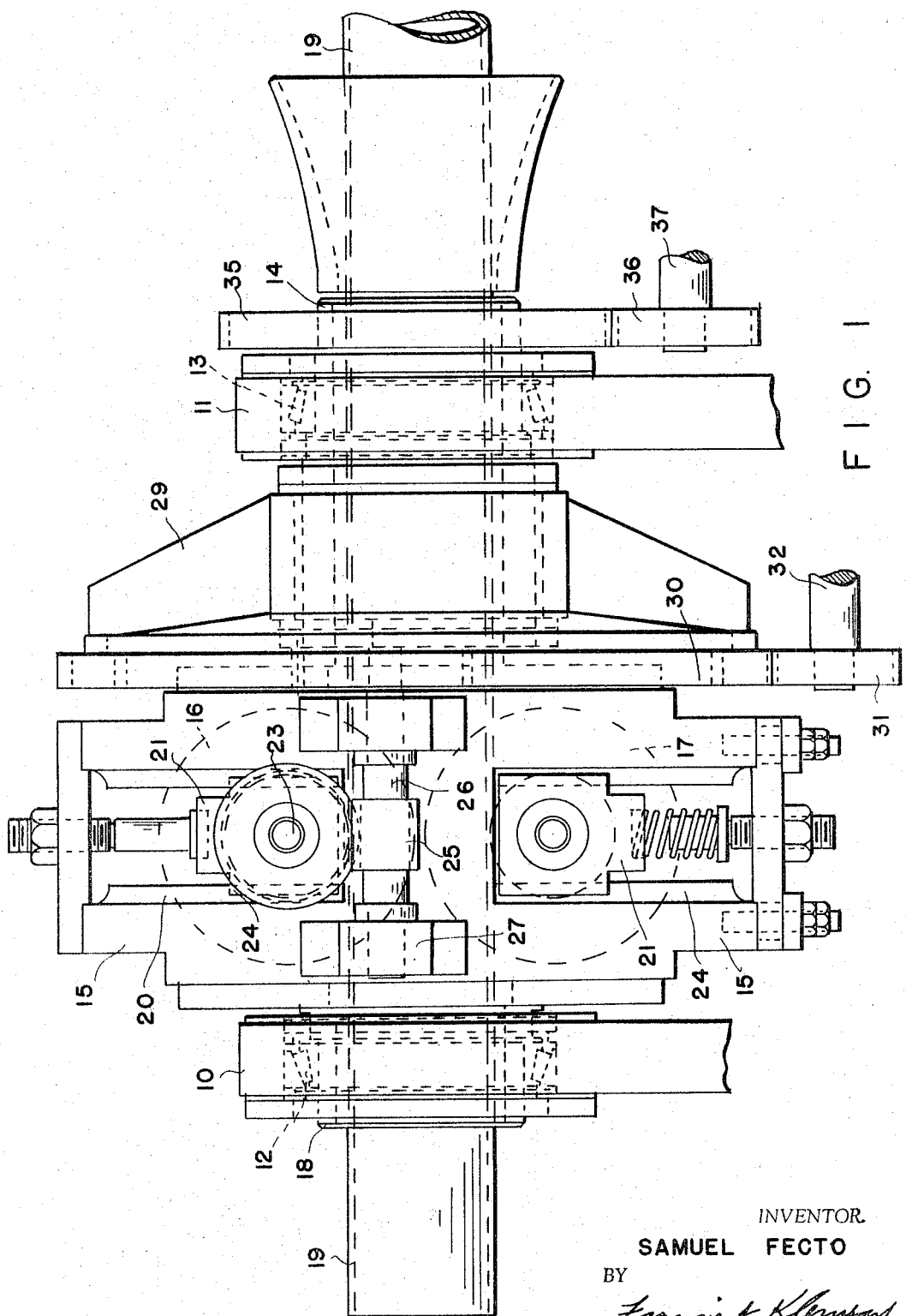

March 7, 1967 S. FECTO 3,307,725
COMBINED ADVANCING AND ROTATING FEEDING
HEAD FOR ELONGATED STOCK
Filed Dec. 29, 1964 2 Sheets-Sheet 1

INVENTOR.
SAMUEL FECTO
BY
*Francis J. Klempay*
ATTORNEY

INVENTOR.
SAMUEL FECTO

United States Patent Office 3,307,725
Patented Mar. 7, 1967

3,307,725
COMBINED ADVANCING AND ROTATING FEEDING HEAD FOR ELONGATED STOCK
Samuel Fecto, Hubbard, Ohio, assignor to The Taylor-Winfield Corporation, Warren, Ohio, a corporation of Ohio
Filed Dec. 29, 1964, Ser. No. 421,969
2 Claims. (Cl. 214—338)

This invention relates to the longitudinal feeding of elongated stock—tubes, for example—along a spiral path whereby the stock will have precise rotation simultaneously with its longitudinal advancement.

Such equipment is widely used where it is desired to weld a cooling fin onto the exterior surface of pipe or tubing and/or when it is desired to spirally wrap pipe as a covering for a coating composition. Heretofore, this general mode of feeding has been commonly accomplished through the use of driven skewed rolls which engage the exterior surface of the pipe or tube to simultaneously impart both longitudinal and rotational movement thereto. However, if the feeding is to be adjustable, each supporting roll has but a single point of contact with the pipe which induces slippage and thus an erratic pattern of movement to the pipe which interferes with the accurate application of material to the pipe. Also, and particularly in the case of thin-walled pipe or tubing, the concentration of the gripping and/or driving forces at but a few points on the periphery of the pipe distorts the shape of the workpieces and results in erratic rotational and/or longitudinal feed rates. It is also true that when driven skewed rolls are used the adjustment of the angle of skew is very critical and fails to impart the precise pattern of movement to the workpiece which is required in some fabricating processes.

The primary object of the invention is to provide a precision type of spiral drive for an elongated workpiece which overcomes the various objects enumerated above, which is entirely practical and trouble free in operation, and which has substantially unlimited adjustability. It is a further object of the invention to provide improved apparatus for longitudinally feeding elongated stock axially along the spiral path of movement in which the rotating speed and the longitudinal feed are independently adjustable thereby greatly extending the usefulness of equipment of the general kind under discussion.

The above and other objects and advantages of the invention will become apparent upon consideration of the following specification and the accompanying drawing wherein there is disclosed a preferred embodiment of the invention.

Figure 2:
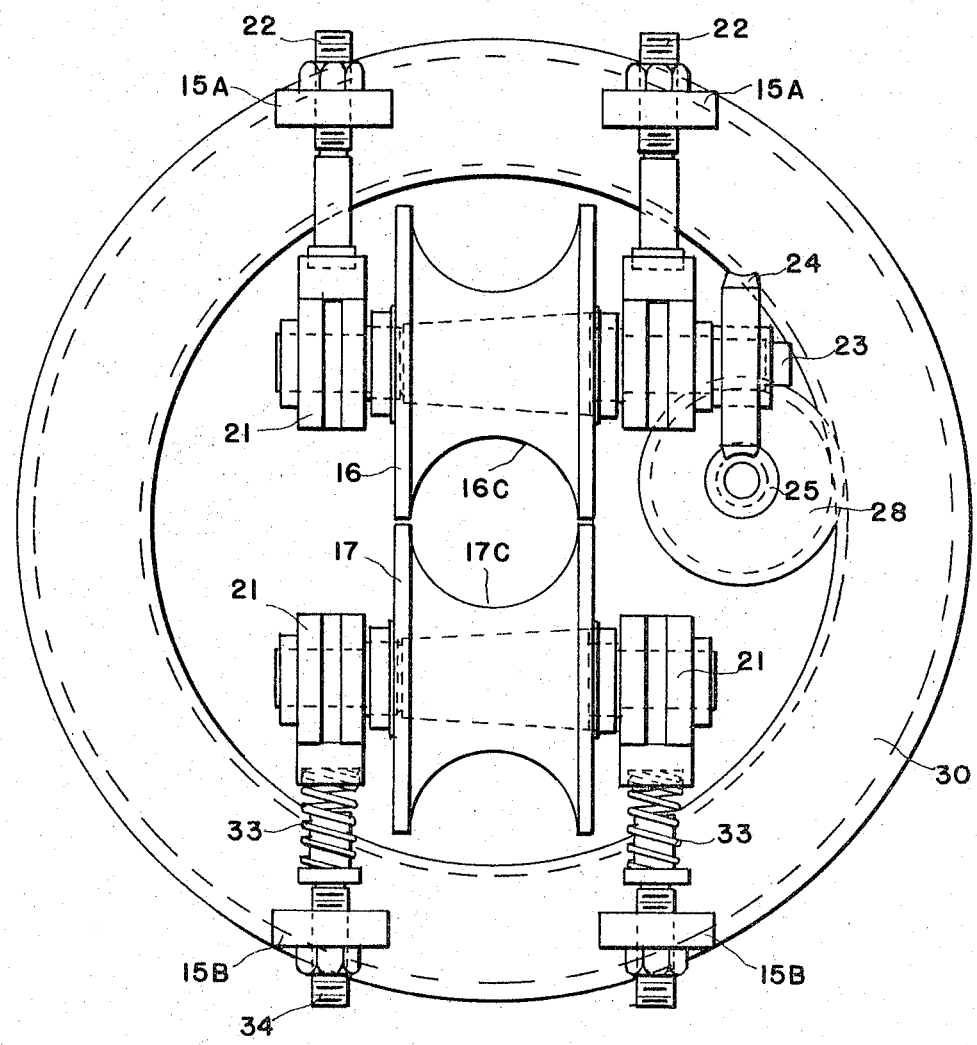

In the drawing:

FIGURE 1 is a side elevation of a feeding unit constructed in accordance with the principles of the invention; and FIGURE 2 is a fragmentary transverse view of the assembly of FIGURE 1.

In the drawing, reference numerals 10 and 11 indicate a pair of longitudinally spaced and normally fixed base supports which are suitably bored to receive the tapered roller bearings 12 and 13, respectively, thereby providing an anti-friction support for the rotating carriage of the assembly. This carriage which may be integrally formed or suitably assembled from separate components comprises an elongated hollow spindle 14 which is journaled in the bearing 13 and which extends through to a frame 15 journaling a pair of pinch rolls 16 and 17 which will be described in greater detail below. Rigidly connected to the other end of frame 15 is a hollow spindle 18 journaled in the bearing 12. The opening through spindles 14 and 18 are sufficiently large to accommodate any workpiece which herein is represented by a length of pipe 19.

The frame 15 is formed with two diametrically opposed but aligned sets of guides each comprised of four linear guiding surfaces 20. These surfaces 20 are for the purpose of retaining and guiding the journal chocks 21 for sliding movement toward and away from the axis of rotation of the frame 15. Journaled in these chocks are the shafts or spindles for the rolls 16 and 17.

The chocks 21 supporting the roll 16 are arranged to be locked securely in adjusted position by set-screws 22 which are screw threadably received in components 15A which are rigid patrs of the frame 15. Roll 16 is keyed onto its supporting shaft 23, and keyed onto this shaft is a worm wheel 24. Meshing with the worm wheel 24 is a worm 25 mounted on a shaft 26 which is journaled on the frame 15 by the pillow blocks 27. As indicated in the figures of the drawing, the shaft 26 extends outwardly through one of the blocks 27 toward the support 11 and has mounted on its free extended end a small pinion gear 28.

Mounted for free rotation on an inner portion of the spindle 14 is a spider-like carrier 29 having outwardly extending arms and which mounts a ring 30. Both the inner and outer peripheral surfaces of the ring 30 are formed with gear teeth, as shown schematically in FIGURE 2, the internal teeth meshing with the pinion gear 28. It should now be apparent that rotation of the ring gear 30 will drive the roll 16 through the gears 28, 25, 24 and the shafts 26 and 23. Ring gear 30 is arranged to be driven through its external gears by a pinion 31 mounted on shaft 32, the shaft 32 being, in turn, driven by any suitable power source, preferably of the variable speed type.

The chocks supporting the roll 17 are arranged to be yieldingly biased toward the axis of rotation of the frame 15 by a pair of coil springs 33 bearing against adjustable screws 34 which are screw-threadably received in elements 15B forming part of the frame 15. This frame is arranged to be independently rotated by a gear 35 (FIGURE 1) keyed onto the spindle 14 and driven by a pinion 36 carried by shaft 37. Again, the shaft 37 is driven from any suitable power source, not shown herein, but preferably of the variable speed type.

Considering now the operation of the apparatus described above, it should be apparent that the work-driving rolls 16 and 17 may be contoured as at 16C and at 17C precisely to the contour of the elongated workpiece regardless of the cross-sectional shape of the workpiece. Springs 33 are of such strength as to apply sufficient clamping force to the workpiece to insure that the latter moves precisely in accord with the speed of rotation of the rolls 16, 17 while rotating precisely in synchronism with the rotation of the frame 15 which mounts these rolls 16 and 17. The entire extent of the pass projection of the drive roll 16 is available to create sufficient longitudinal moving forces through friction, and the full extent of the pass projection of both the roll 16 and the roll 17 is available to rotate the workpiece. Accordingly, the consistency of and the responsiveness to changes in desired patterns of movement of the workpieces is very much improved in the present apparatus over prior devices used for the same general purpose, such as skewed drive rolls, etc.

By independently varying the speeds of the two drive shafts 32 and 37, wide fluctuations may be made in the lead and longitudinal speed of the workpiece, and so long as the shafts 32 and 37 are maintained at their desired selected speed the pattern of movement of the workpieces will be maintained consistently uniform. Also, adequate torque and forward thrust of the workpieces will be substantial and adequate to resist any reasonable counterforces which are applied to the workpieces at the processing or working station of which the present apparatus may be an adjunct.

Having thus described my invention what I claim is:

1. Apparatus for longitudinally advancing an elongated workpiece along a spiral path comprising in combination a frame, means mounting said frame for rotation about the longitudinal axis of advancement of the workpiece, means for rotating said frame about said axis, a pair of workpiece-engaging rolls journaled on said frame for rotation about spaced axes transverse of said first mentioned axis, said means journaling said rolls including means to yieldingly bias said rolls toward each other whereby a workpiece may be clamped therebetween, means to drive one of said rolls comprising a shaft journaled on said frame and extending parallel to but outwardly of said first mentioned axis, a pinion gear keyed on said shaft, a ring gear mounted for rotation about said first mentioned axis and having gear teeth meshing with said pinion gear, means for rotating said ring gear, a pair of separate and independent drive shafts for rotating said frame and for driving said ring gear, respectively, the arrangement being such that by varying the absolute and relative speeds of said drive shafts the longitudinal rate of advancement of the workpiece may be varied as well as the rotation of the workpiece relative to its longitudinal movement, said ring gear being formed with gear teeth on both its inner and outer peripheries, the inner gear teeth meshing with said pinion gear, and said apparatus further including a second pinion gear on one of said separate shafts meshing with the external teeth of the ring gear.

2. Apparatus according to claim 1 further characterized in that said frame includes a spindle rigidly attached thereto by which said frame is at least partially supported for rotation, a spider-like support journaled on said spindle and having radially outward extending arms, and said ring gear being supported radially intermediate its inner and outer gear teeth on the outer ends of said arms.

References Cited by the Examiner

UNITED STATES PATENTS

| | | | |
|---|---|---|---|
| 1,096,857 | 5/1914 | Pederquist | 226—187 |
| 1,224,046 | 4/1917 | Turley | 226—187 X |
| 2,371,090 | 3/1945 | Westin et al. | 226—102 X |
| 2,429,201 | 10/1947 | Connor et al. | 214—338 |

FOREIGN PATENTS 1,228,909   3/1960   France.

M. HENSON WOOD, JR., *Primary Examiner.*

V. C. WILKS, *Assistant Examiner.*